United States Patent [19]

Frost et al.

[11] Patent Number: 4,652,458

[45] Date of Patent: Mar. 24, 1987

[54] SILICA GEL-LIPID COMPOSITION

[75] Inventors: John R. Frost, Tarrytown; Nancy J. Sarich, Putnam Valley; John Ruff, Pomona, all of N.Y.; John E. Hammond, Glen Rock, N.J.

[73] Assignee: General Foods Corporation, White Plains, N.Y.

[21] Appl. No.: 777,818

[22] Filed: Sep. 19, 1985

[51] Int. Cl.$^4$ .......................... A23D 5/00; A23G 1/00
[52] U.S. Cl. .................................... 426/573; 426/601; 426/607; 426/423; 426/631; 426/659; 426/660
[58] Field of Search ............... 426/601, 607, 423, 631, 426/613, 573, 659, 660, 572

[56] References Cited

U.S. PATENT DOCUMENTS

| | | | |
|---|---|---|---|
| 3,404,011 | 10/1968 | Eolkin | 426/654 |
| 3,669,681 | 6/1972 | Shoaf | 426/601 |
| 4,375,483 | 3/1983 | Shuford | 426/423 |
| 4,471,001 | 9/1984 | Lynch | 426/573 |

Primary Examiner—Jeanette Hunter
Attorney, Agent, or Firm—Thomas A. Marcoux; Thomas R. Savoie; Daniel J. Donovan

[57] ABSTRACT

An irreversible gel composition which comprises silica gel and a lipid. A non-waxy, no melt chocolate may be prepared using the silica gel-lipid composition of the present invention by combining silica gel with cocoa butter wherein the cocoa butter serves as the lipid source.

26 Claims, No Drawings

SILICA GEL-LIPID COMPOSITION

FIELD OF THE INVENTION

The present invention relates to a silica gel-lipid composition. More particularly the present invention is concerned with a silica gel-lipid composition in which silica gel is combined with lipid so as to form a gel which is thermally irreversible.

DESCRIPTION OF THE PRIOR ART

The physical structure of a lipid—its double bonds, the location of its double bonds, and the stereochemistry of its double bonds—normally determine the lipid's properties. However, food processors typically desire a mix of properties not available with any one particular lipid, for example, a flaky pie crust requires a hard fat, but nutritionally, polyunsaturated oils are preferred. Consequently, food processors desire a method for modifying lipid properties. U.S. Pat. No. 4,536,410 to Vacarro et al., discloses the combination of APM and lipid wherein the APM modifies the physical characteristic of the lipid component by the formation of a crystalline matrix which retains its integrity at temperatures substantially above and below room temperatures. However, the APM due to its inherent sweetness is undesirable in applications wherein such sweetness is not required, such as chocolates which are sweetened with natural sugar.

SUMMARY OF THE INVENTION

Accordingly, one object of the present invention is to provide a means for modifying the physical attributes of a lipid.

Another object of this invention is to provide a non-waxy, good tasting chocolate which does not melt at hand/body temperature (37° C.).

Briefly, these and other objects of the present invention, as will hereinafter be more readily apparent, can be obtained by a silica gel composition which comprises silica gel and a lipid, the composition effectively modifies the physical character of lipids without imparting excessive sweetness.

DETAILED DESCRIPTION OF THE INVENTION

While any lipid may be useful in the present invention, it is preferred that the lipid component be selected from the group composed of hydrocarbons, aliphatic alcohols, aliphatic acids, esters of aliphatic acids, glycerol containing lipids and combinations thereof. It is more preferred that the lipid component of the present invention be selected from the group composed of aliphatic acids, esters of aliphatic acids, glycerol containing lipids and combinations thereof and be composed of from about 10% to about 100% triglycerides with a melting point from about −10° C. to about 50° C. Aliphatic fatty acids esters are more preferred and the aliphatic fatty acid esters of glycerol are the most preferred lipids of the present invention. Examples of aliphatic fatty acid triesters useful in the present invention comprise tallow, lard, cocoa butter, palm oil, palm kernel oil, coconut oil, cotton seed oil, peanut oil, rape seed oil, corn oil, safflower oil, sunflower oil, soy bean oil and combinations thereof. Glycerol diesters, proplyene glycol diesters, and combinations thereof are examples of aliphatic fatty acid diesters useful in the present invention. Fatty acid monoesters useful in this invention comprise: monoglycerides, propylene glycol and monostearate and combinations thereof. Moreover, it is preferred that the fatty acid residues of the esters consist essentially of saturated, unsaturated, and polyunsaturated aliphatic acids containing between about 10 and about 30 carbon atoms, and combinations thereof.

The silica gel is combined with at least about 1 but less than about 100 parts of lipid for each part of the silica gel. However, it is preferred that at least about 3 to about 30 parts of lipid are combined with each part silica gel. The silica gel-lipid admixture is agitated so as to thoroughly blend the components, and, it is preferred that the admixture is kept at or below the temperature at which the lipid used decomposes, a temperature commonly known as the lipid's smoke point. It is further preferred that the admixture temperature be kept at least 10° C. below this lipid decomposition temperature or smoke point, and that the lipid temperature at the time the lipid component and the silica-gel are combined is less than about 195° C., and more preferably this temperature is less than about 175° C. However, once the silica gel lipid combination has started to form, the admixture may be heated to the lipids decomposition temperature even if this temperature exceeds the silica gel decomposition temperature without destroying the gel.

While it is possible to incorporate additional ingredients or materials into the silica gel-lipid admixture before the gel's formation, some additional ingredients will, at some concentrations, inhibit or prevent the gel's formation, e.g. large amounts of water. Thus it is also preferred that if the silica gel-lipid combination is to contain other materials, these addition ingredients be incorporated at a level less than the level at which these materials are effective to inhibit the gel's formation.

The thermally irreversible gel of the present invention is produced through the mixing of silica gel with the lipid source. The pseudo-plastic and thixotrophic properties of the gel causes the viscosity of the gel to be so high that it will not flow at elevated temperatures, yet the shear conditions of chewing and swallowing thin the viscosity to that of lipid alone so that the confection has a creamy texture. The viscosity is determined by measuring the viscosity of the admixture; subtracting the viscosity of the lipid with the silica gel added at the instant the silica gel was added to the lipid from the viscosity of the admixture; and dividing this quantity by the viscosity of the lipid with the silica gel added at the instant the silica gel was added to the lipid. All of these viscosity measurements are made at the same temperature, which temperature is above the lipid component's melting point or range. Restated, the increase in viscosity is determined by the following formula:

$$\Delta \eta = \frac{(\eta_A - \eta_L)}{\eta_L}$$

wherein, $\Delta \eta$ is the increase in viscosity;

$\eta_A$ is the viscosity of the admixture; and $\eta_L$ is the viscosity of the lipid and silica gel combination at the point in time at which the silica gel is added to the lipid. Thus, $\eta_L$ compensates for the increase in viscosity due to the presence of an additive dispersed in the lipid.

In most cases $\eta_L$ will be approximately equal to the viscosity of the oil alone.

However, it is preferred that the silica gel and lipid be combined for a time sufficient to form a structured matrix effective to produce a viscosity increase about at least about 1,000% (10) and more preferably at least about 10,000% (100). Nonetheless, the viscosity increase is preferably less than about $10^7$ fold.

While viscosity may be measured in a number of ways, the Brookfield HAT Viscometer is an especially preferred instrument for measuring the viscosity of the gel of the instant invention. In measuring the viscosity of the gel of the instant invention with a Brookfield HAT Viscometer, a configuration of said instrument comprising a helipath stand and either a cylindrical or a T-bar spindle is further preferred. Typical use of this instrument will require placing about 200 ml of the material whose viscosity is to be measured in a 250 ml beaker. Next, an appropriate spindle and rotation speed (rpm) is chosen for the Viscometer to obtain a reading within the range of the instrument's indicator. Then, using for example the helipath stand and a T-bar spindle, the instrument is turned on and the spinning spindle is allowed to penetrate the sample. While the spinning spindle is in the sample, a dial or indicator reading is made. The dial reading is converted to a centipoise viscosity measurement by multiplying the dial reading by a factor that is appropriate for the spindle and the speed of rotation used. Thus, the "F" T-bar rotating at 0.5 rpm dial reading is multiplied by $4 \times 10^5$, and the #2 cylindrical spindle rotating at 50 rpm dial reading is multiplied by 16.

A sweet, good tasting, non-waxy chocolate which does not melt at hand-body temperature, may be prepared by combining the silica with cocoa butter which serves as the lipid source, to produce one of the silica gel-lipid compositions of the present invention.

To prepare the chocolate of the present invention the cocoa butter is first heated so as to melt the fat. The silica gel is then admixed with the melted cocoa butter at a ratio of from about 1 to about 100 parts cocoa butter per part silica gel, and more preferably from about 3 to about 30 parts cocoa butter per part silica gel. The viscosity of the resulting mixture will be in excess of 200 cps at 100° C. under low shear conditions and more preferably to an excess of 1,000 cps and most preferred to an excess of 10,000 cps at 100° C. under low shear conditions. Afterwards the mixture of cocoa butter and silica gel is cooled to a temperature of below 20° C.

This cooled silica gel-cocoa butter gel composition is then used as a replacement for the lipid fractions of conventional chocolate manufacture. Typically, chocolate is produced by admixing a lipid source, lecithin, sugar, milk powder and chocolate liquor; refining the resulting mixture by passing it through rolls to achieve a particle size of from about 35 to about 50 microns; followed by conching, for a period of from about 1 hour to about 100 hours so that the mixture becomes a fluid, tempering, at a temperature of from about 25° C. to about 27° C. for from about 5 minutes to about 1 hour to achieve proper crystal formation and pouring the tempered mixture into molds to achieve the desired form, and finally storing the mixture at 10° C. for a period of from about 1 hour to 100 hours to set the chocolate. The above process is routinely utilized in the manufacture of chocolate and is well known to those skilled in the art of chocolate manufacturing. Additional information concerning the manufacture of chocolate may be obtained from "Chocolate, Cocoa and Confectionary Science and Technology" by Bernard Minifie (1970) which is herein incorporated by reference. The silica gel cocoa butter gel typically will comprise from 5 to about 40% by weight of the final product and more typically 15 to about 30%. The lecithin will comprise between 0.01 and about 3% of the final product and more preferrably 0.2 to 1%. The sugar component typically comprises from about 30 to about 65% of the final product and more preferably from 50 to 60%. The milk powder should comprise between 0.01 and 20% of the final product and more preferrably between 10 and about 15%, while the chocolate liquor component comprises from about 3 to about 30% of the final product and more preferrably from 8 to 12%.

EXAMPLE

Cocoa butter, 1221 grams, was heated in a double boiler at 50° C. until thoroughly melted. To this melted cocoa butter was added 45 grams of silica gel. The mixture, after setting, was then cooled to below room temperature. This silica gel-cocoa butter gel composition was then mixed with sugar (3194 grams), lecithin (28 grams), milk powder (740 grams), and chocolate liquor (568 grams) and the resulting mixture was mixed by using a melanqeor. This mixture was then refined by passing through refining rolls to produce particles of about 40 microns in size, conched for approximately 2 hours to fluidize the mixture, tempered at 27° C. for approximately 15 minutes to achieve crystal formation and finally molded to the desired form and stored at 10° C. for 2 hours to set the chocolate.

What is claimed:

1. An edible thermally irreversible silica gel-lipid gel composition comprising by weight:
   (a) one part silica gel; and
   (b) about 1 to about 100 parts lipid per part silica gel wherein said lipid is selected from the group consisting of aliphatic acids, aliphatic acid esters and combinations thereof wherein said silica gel-lipid composition is effective to form a gel.

2. A gel according to claim 1 wherein said gel comprises between about 3 and about 30 parts lipid per part silica gel.

3. A gel according to claim 1 wherein said gel has a viscosity in excess of 200 cps at 100° C. under low shear conditions.

4. A gel according to claim 1 wherein said gel has a viscosity in excess of 1,000 cps at 100° C. under low shear conditions.

5. A gel according to claim 1 wherein said gel has a viscosity in excess of 10,000 cps at 100° C. under low shear conditions.

6. A gel according to claim 1 wherein said aliphatic acids and aliphatic acid residues are composed essentially of saturated, unsaturated and polyunsaturated acids and acid residues containing between about 10 and about 30 carbon atoms, and combinations thereof.

7. A gel according to claim 1 wherein at least about 10% of said lipid is comprised of triglycerides.

8. A gel according to claim 7 wherein said triglyceride has a melting point less than about 50° C.

9. A gel according to claim 8 wherein said triglyceride has a melting point of at least about −16° C.

10. A gel according to claim 1 wherein at least about 10% of said lipid comprised aliphatic acid monoesters, aliphatic acid diesters, and combinations thereof.

11. A gel according to claim 10 wherein less than about 40% of said lipid is comprised of triglycerides.

12. A gel according to claim 11 wherein substantially all of the lipid is composed essentially of aliphatic acid monoesters, aliphatic acid diesters and combinations thereof.

13. A gel according to claim 1 wherein said lipid is cocoa butter.

14. A method for producing a chocolate which does not melt at body/hand temperature (37° C.) comprising the steps of:
   (a) adding silica gel to melted cocoa butter and;
   (b) cooling said mixture of melted cocoa butter and silica gel to a temperature below 20° C.;
   (c) mixing the silica gel-cocoa butter gel with lecithin, sugar, milk powder and chocolate liquor;
   (d) refining the mixture of step (c) by passing same through rolls to produce particles between about 35 to about 50 microns in size;
   (e) conching the mixture until it becomes a fluid;
   (f) tempering the resulting mixture for a time sufficient for crystal formation; and
   (g) pouring the resulting mixture into molds and storing until the mixture is set.

15. The method of claim 14 wherein the silica cocoa butter gel composition of step c comprises from about 5% to about 40% by weight of the final product.

16. The method of claim 15 wherein the silica cocoa butter gel composition comprises from about 15% to about 30% by weight.

17. The method of claim 14 wherein the lecithin component of step c comprises from about 0.01 to about 3% by weight of the final product.

18. The method of claim 17 wherein the lecithin comprises from about 0.2 to about 1%.

19. The method of claim 14 wherein the sugar component of step c comprises from about 30 to about 65% by weight of the final product.

20. The method of claim 19 wherein the sugar comprises from about 50 to about 60%.

21. The method of claim 14 wherein the milk powder component of step c comprises from about 0.01 to about 20% by weight of the final product.

22. The method of claim 21 wherein the milk powder comprises from about 10 to about 15%.

23. The method of claim 14 wherein the chocolate liquor component of step c comprises from about 3 to about 30% by weight of the final product.

24. The method of claim 23 wherein the chocolate liquor comprises from about 8 to about 12%.

25. An improved chocolate which does not melt at hand/body temperature wherein the improvement comprises replacing the cocoa butter fraction of said chocolate with a silica-cocoa butter gel composition comprising silica gel and cocoa butter and wherein the composition contains by weight from about 1 to about 100 parts of cocoa butter per part silica gel.

26. An improved process for making chocolate which does not melt at hand/body temperature comprising the steps of mixing cocoa butter, lecithin, sugar, milk powder and chocolate liquor; refining, conching, tempering and pouring the resulting mixture into molds to allow the mixture to set; wherein the improvement comprises replacing the cocoa butter fraction of said chocolate with a silica gel-cocoa butter gel composition.

* * * * *